(12) United States Patent
Kim

(10) Patent No.: US 7,430,178 B2
(45) Date of Patent: Sep. 30, 2008

(54) ERROR DETECTING METHOD OF MOBILE COMMUNICATION SYSTEM

(75) Inventor: Sung-Deuk Kim, Kyongki-Do (KR)

(73) Assignee: LG Electronics Inc., Seoul (KR)

( * ) Notice: Subject to any disclaimer, the term of this patent is extended or adjusted under 35 U.S.C. 154(b) by 940 days.

(21) Appl. No.: 10/600,756

(22) Filed: Jun. 23, 2003

(65) Prior Publication Data

US 2004/0008631 A1 Jan. 15, 2004

(30) Foreign Application Priority Data

Jun. 24, 2002 (KR) ...................... 10-2002-0035380

(51) Int. Cl.
*H04L 1/00* (2006.01)
*G06F 11/00* (2006.01)

(52) U.S. Cl. ........................ 370/242; 370/333; 714/746; 714/799; 714/800

(58) Field of Classification Search .................. 370/333; 714/746, 799, 800
See application file for complete search history.

(56) References Cited

U.S. PATENT DOCUMENTS

| | | | |
|---|---|---|---|
| 4,680,763 A * | 7/1987 | Suma et al. .................. 714/758 |
| 5,491,719 A * | 2/1996 | Sellin et al. ................... 375/213 |
| 5,550,756 A * | 8/1996 | Ohmi et al. ................... 709/247 |
| 5,995,171 A | 11/1999 | Enari et al. |
| 6,732,321 B2 * | 5/2004 | Classon et al. ............... 714/774 |
| 6,944,802 B2 * | 9/2005 | Park et al. ..................... 714/701 |
| 7,106,712 B2 * | 9/2006 | Hamabe et al. .............. 370/332 |
| 2006/0200708 A1* | 9/2006 | Gentieu et al. ............... 714/704 |
| 2008/0025264 A1* | 1/2008 | Willenegger et al. ......... 370/333 |

FOREIGN PATENT DOCUMENTS

JP 08-294123 11/1996
KR 1020000046107 A 7/2000

OTHER PUBLICATIONS

Office Action issued by Korean Patent Office Sep. 23, 2004.
Chinese Office Action dated Aug. 24, 2007, and its English translation.

* cited by examiner

*Primary Examiner*—Edan Orgad
*Assistant Examiner*—Blanche Wong
(74) *Attorney, Agent, or Firm*—Ked & Associates, LLP

(57) ABSTRACT

A system and method detects an uplink error during the transmission of visual data in a mobile communication system. When such an error is detected in data which has passed an uplink radio section, a specific CRC code causing a 'CRC fail' is inserted into a corresponding data block. Accordingly, an error detection available region can be extended and a picture quality of a mobile image of a mobile communication terminal can be substantially improved.

27 Claims, 4 Drawing Sheets

ERROR DETECTING METHOD OF MOBILE COMMUNICATION SYSTEM

BACKGROUND OF THE INVENTION

1. Field of the Invention

The present invention relates to mobile communication systems and more particularly to a system and method for detecting transmission errors in a mobile communications system.

2. Description of the Related Art

In order to transmit images in a mobile communications system, mobile terminals perform bi-directional communications based on a circuit network. The circuit network is a transmission method of a concept corresponding to a packet network. Once the transmission path is set, the circuit network allows a calling/called terminal to use the set path exclusively. In view of characteristics of the circuit network, there should be data transmitted at every time at the transmission line. And, as soon as data is put on the transmission line, the data is transmitted as is to a receiving side.

FIG. 1 is a drawing showing a related-art mobile image data transmission system. In this system, when a mobile image data transmission is performed between a calling terminal and a called terminal, the mobile image data of the calling terminal passes through a radio section of an originating side and a radio section of a destination side. At this time, if an error occurs in the transmission data in the radio section of the originating side, the destination terminal should be informed the corresponding error information.

However, in the related-art system, once the data is transmitted from the originating terminal, it is transmitted to the receiving terminal even though the data contains an error. That is, when an error occurs in the radio section of the originating side, there is no way to inform an image application such as a video decoder (or a video codec) of the receiving side of the error occurrence.

SUMMARY OF THE INVENTION

An object of the present invention is to improve the accuracy and efficiency of image transmissions in a mobile communications system.

Another object of the present invention is to provide a system and method for detecting errors in a mobile communication system and for then transmitting information on the detected error to a receiving side of the system.

Another object of the present invention is to provide a system and method for detecting errors in transmission data and for then blocking transmission of that data in order to prevent image quality from being degraded at a receiver.

To achieve these and other objects and advantages in whole or part, the present invention provides an error detecting method in a mobile communication system in which if an error is detected in data which has passed an uplink radio section, a specific CRC code causing a 'CRC fail' is inserted into a corresponding data block. Preferably, the specific CRC code has a standardized bit pattern, and the specific CRC code is generated and inserted by a base station system of a transmitting side.

The present invention further provides an error detecting method in a mobile communication system which includes the steps of: checking whether there is an error in data which has passed an uplink radio section; inserting a specific CRC code causing a 'CRC fail' into the data block if the data is detected to have an error; and performing an error detection routine and reporting a result to an image application when each data block is received by a receiving side through a predetermined transmission path. Preferably, if the report is made according to error detection, the image application performs a concealment operation on a corresponding data block.

The present invention also provides an error detecting method in a mobile communication system which includes the steps of: checking whether there is an error in a data which has passed an uplink radio section; inserting a specific CRC code causing a 'CRC fail' into the data block if the data is detected to have an error; performing an error detection routine on each data block as received by a receiving side; and stopping a decoding on a data block and performing a concealment operation if the data block is detected to have an error.

The present invention also provides an error detecting method in a mobile communication system which includes the steps of: checking whether there is an error in a data which has passed an uplink radio section; deleting an error-detected data block and transmitting a normal data block to a receiving terminal; checking whether each data block has been received timely by the receiving side; and judging that there has occurred an error in a data block in the uplink radio section if the data block has not been received timely, and performing a concealment operation on the data block.

DETAILED DESCRIPTION OF PREFERRED EMBODIMENTS

The present invention is a system and method of informing a destination terminal that an error occurred in a data block which has passed through a radio section of an originating side of a mobile communications system. This results in improving error detection performance and thus the accurate and stable reproduction of a mobile image transmitted through the system.

The method is preferably performed in accordance with at least one of the following two features. A first feature is to transmit a cyclic redundancy check (CRC) code causing a 'CRC fail' to the receiving terminal, as if an error generated in the radio section of the originating side occurred in a radio section of a destination side. A second feature is not to transmit an error data block so that a receiving terminal can recognize an error occurrence.

As a result, if a packet is not received at a time when a specific data block is to be received (according to the first feature) or if a data block containing an error CRC code is received (according to the second feature), the destination terminal judges that there is an error in the packet in a first or second radio section and then informs an image communication application of the error. Then, the image communication application stops a decoding operation on the corresponding data block and drives a routing to search a sync marker.

Preferably, at the same time, the mobile communication application performs a concealment operation on the lost packet.

A concealment operation is generally used in a mobile image transfer system to conceal a fact from a user that, among data displayed on a screen, there is an error in the data or that some data has been lost. There are several ways to conceal. For example, a value of brightness of a problematic portion of the data may be adjusted to the same value as that of a neighboring image, or data of the same portion of a previous image frame may be copied to the problematic portion. Those skilled in the art can appreciate that other types of concealment operations exist and may be performed in accordance with any of the embodiments described herein, and that the foregoing operations are given merely for illustrative purposes.

A 'sync marker' may correspond to a number of bits of a specific pattern inserted into a bit stream to identify each frame when image data is compressed and converted into a form of a bit stream. Other types of sync markers may be used in accordance with this embodiment of the present invention.

Figure 1:
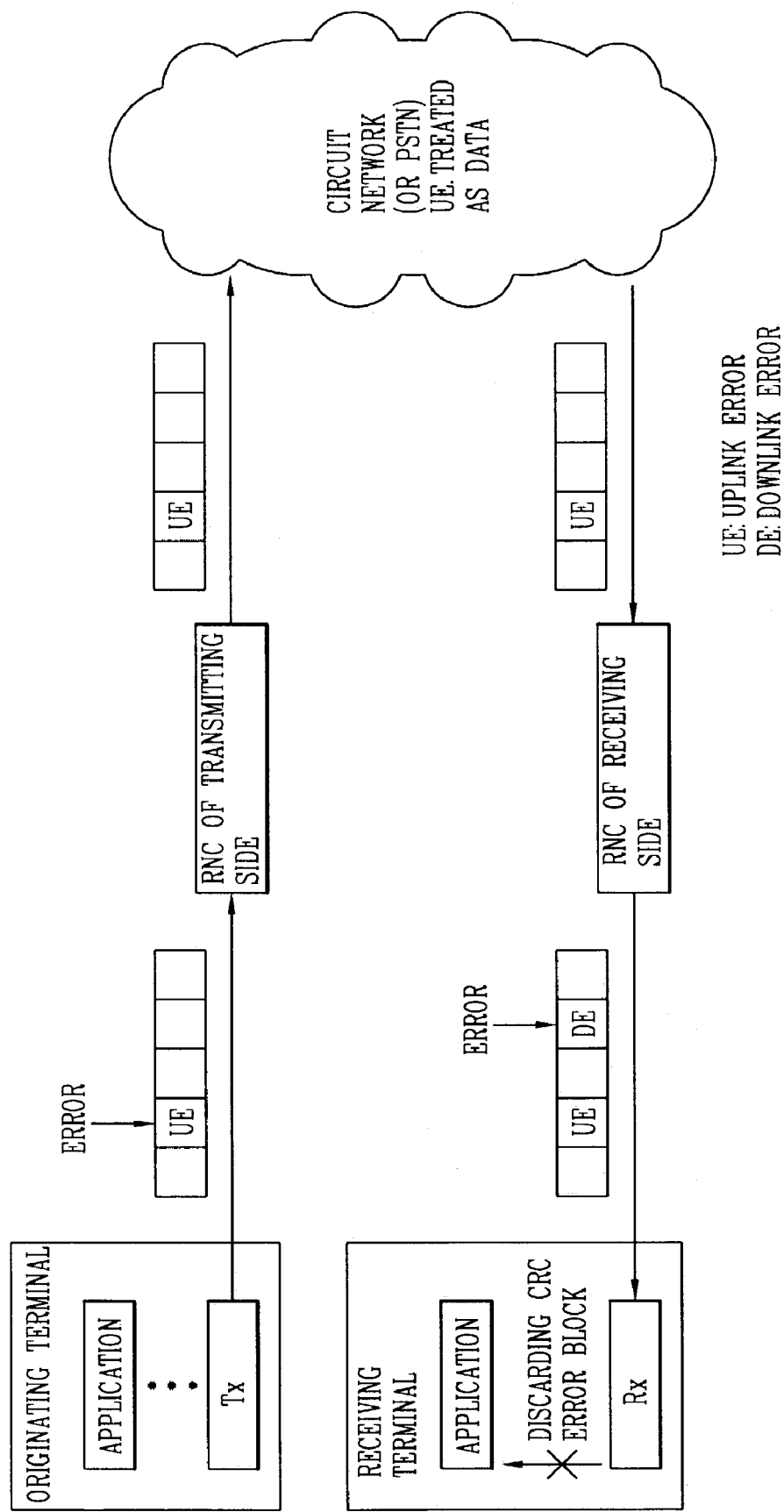
FIG. 1 is a drawing illustrating a related-art mobile image data transmission system.
Figure 2:
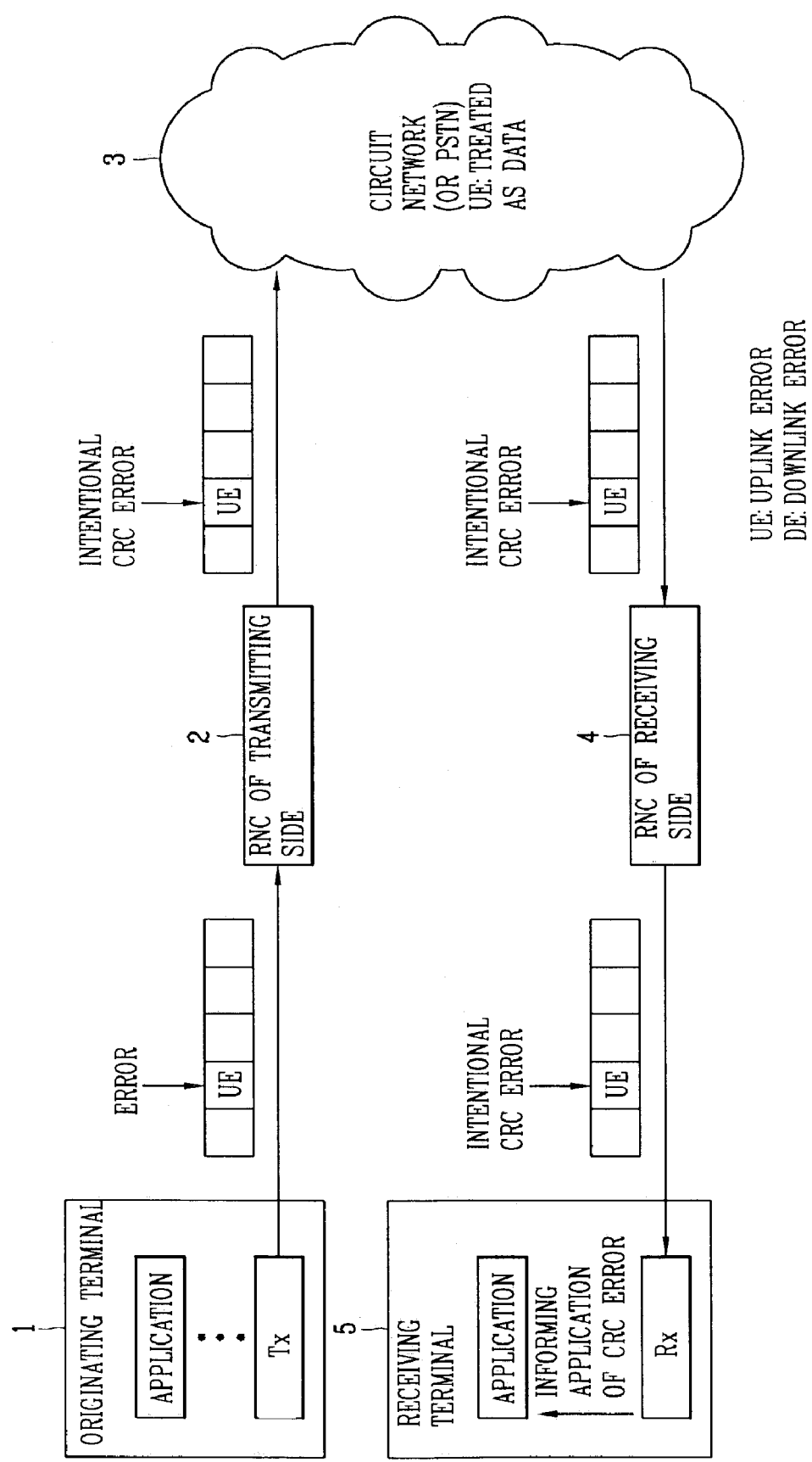
FIG. 2 is a drawing illustrating a mobile image data transmission system in accordance with a preferred embodiment of the present invention.

One preferred embodiment of the system of the present invention will now be described with reference to the accompanying drawings. Referring to FIG. 2, the system includes an originating terminal 1 on a transmitting side and a Radio Network Controller (RNC) 2 coupled to the originating terminal on one side and to a circuit network (a PSTN) 3 on another side. The system also includes an RNC 4 coupled to a receiving terminal 5 on a receiving side. The RNCs on both sides may be included within respective base stations, and the RNC of the originating side preferably includes a detector for detecting errors in accordance with the present invention.

Errors generated in a radio channel include an uplink error (ue) generated in a radio section between a terminal and a radio network controller (RNC) of the transmitting side (hereinafter referred to as 'uplink section') and a downlink error (de) generated in a radio section between an RNC and a terminal of the receiving side.

In related-art systems, when an uplink error (ue) occurs, a corresponding data block is transmitted with the error as is to the circuit network without taking any steps to remove the error, block the transmission of the data block, or notify a destination side of the existence of the error. Therefore, even if a destination side receives the uplink error-generated block, it cannot judge whether the data block is normal or not, e.g., free from errors.

In contrast, in the present invention, when an error occurs in the uplink section, a base station system of the transmitting side adds an error CRC code to a corresponding data block and transmits it to allow the receiving side to recognize an error of the data block without any protocol. This operation may also be performed in a same or similar manner in the base station system of the receiving side. By adding an 'error CRC code' to an error-generated data block and transmitting it, the receiving side can be aware of whether there is an error in the corresponding block or not.

Such an artificially created data block as the data block containing the error CRC code may not be used as an index for detecting a state of the downlink section. More specifically, a bit pattern of the error CRC code may be excluded from consideration of a downlink power control. Because an error CRC code has a standardized bit pattern, the bit pattern of the error CRC code added to a data block is fixed.

The base station system includes a base station, an RNC, an MSC (Mobile Switching Center).

Figure 3:
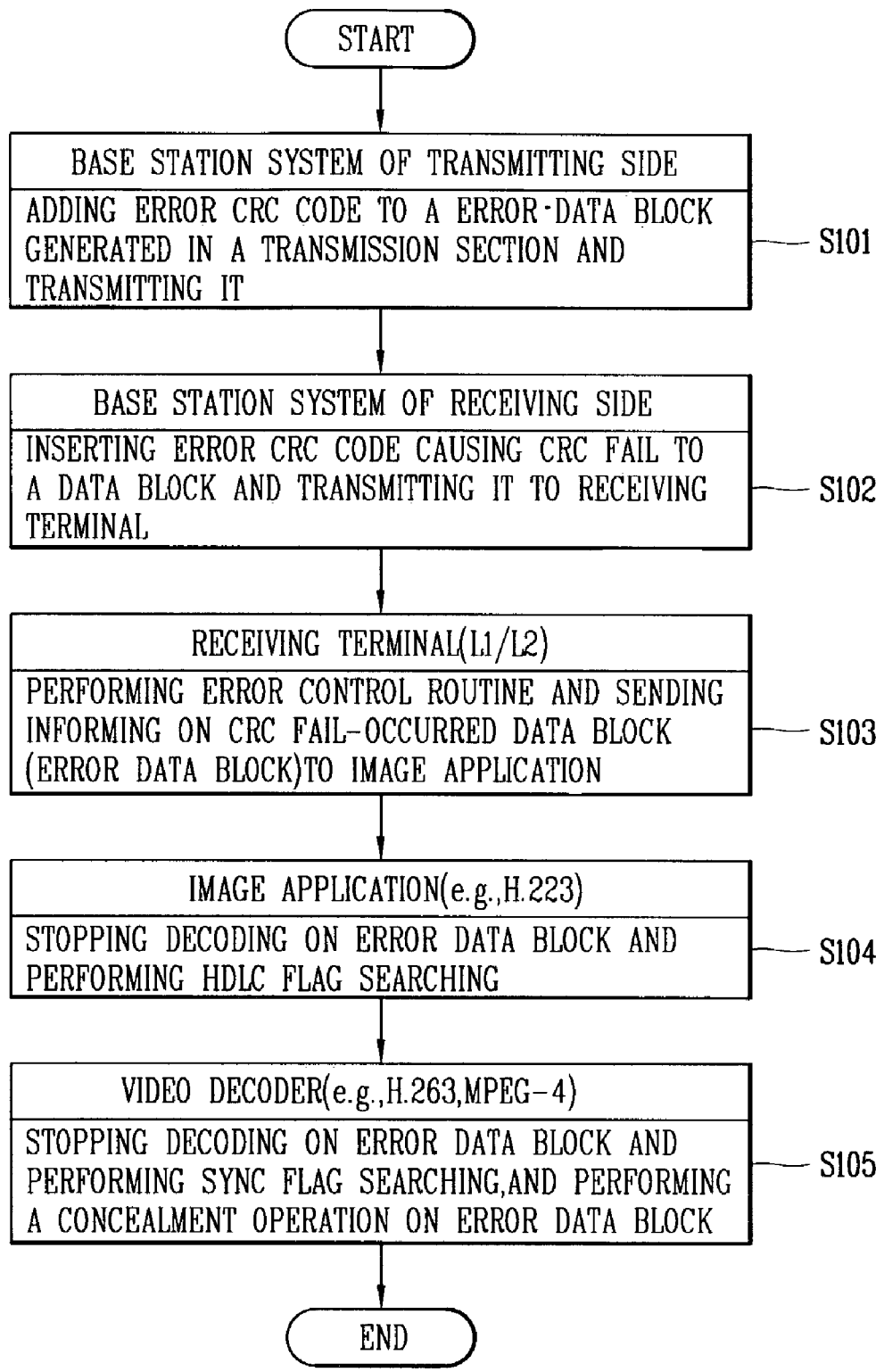
FIG. 3 is a flow chart showing steps included in an error detecting method in accordance with a first embodiment of the present invention.

FIG. 3 is a flow chart showing steps included in an error detecting method in accordance with a preferred embodiment of the present invention.

In an initial step, image data (or a packet) of an originating terminal is transmitted to a circuit network through the uplink section, and then is transmitted to a receiving terminal through the downlink section.

Before reaching the network, a check is performed to determine whether the image data includes a data block having an error. This error-detecting step may be performed in a radio section (e.g., RNC or other element of a base station) on the originating side of the system. If an uplink error (ue) occurs, the base station system of the uplink section that detected the error-contained data block inserts an error code (and preferably an error CRC code) to the detected block and transmits the data block to the circuit network (step S101).

When the data block is transmitted to the circuit network, the base station system of the receiving side inserts an error CRC code causing a CRC fail to the data block and transmits it to a receiving terminal (step S102).

When the data block reaches the receiving terminal, a predetermined layer of the terminal performs an error control routine for checking the CRC code of the data block. The predetermined layer may be the L1 (physical layer) or L2 (protocol layer). If the result is judged to be 'CRC fail', L1 (or L2) reports to the image application in the receiving terminal that there is an error in the corresponding data block (step S103).

Upon receiving the information on the error occurrence from the L1 (or L2), the image application stops a decoding operation on the corresponding data block and performs an HDLC(High-level Data Link Control) flag searching operation. And then, the image application transmits information on the error-generated data block to a video decoder (step S104).

The video decoder stops decoding the data block related to the error CRC code and performs a sync flag searching operation. And then, the video decoder performs a concealment operation on the data block which has been stopped from decoding (step S105).

At least the following effects are attained as the error detection information secured by L1 (or L2) is accurately transmitted to the video decoder.

First, because an error-code generating section is included on an originating side, a decoding can be stably performed.

Second, the error-code generation performed by the present invention allows a concealment operation to be accurately performed.

Third, through the present invention a load of the application is reduced as the application does not need to perform an additional cyclic redundancy check.

Fourth, the receiving side may request fast intra-updating from the transmitting side in order to cope with an error occurrence if necessary. The fast infra updating may, for example, be performed in accordance with a H.245 signal, with which the receiving side requests a terminal of the originating side to create a corresponding image frame of an intra-type and transmits it, as the terminal of the receiving side detects an error from the received image frame. The intra-type frame may have no relation to a previous frame. An abnormally displayed image due to an error on transmission is restored to be clean by receiving the intra-type frame.

Figure 4:
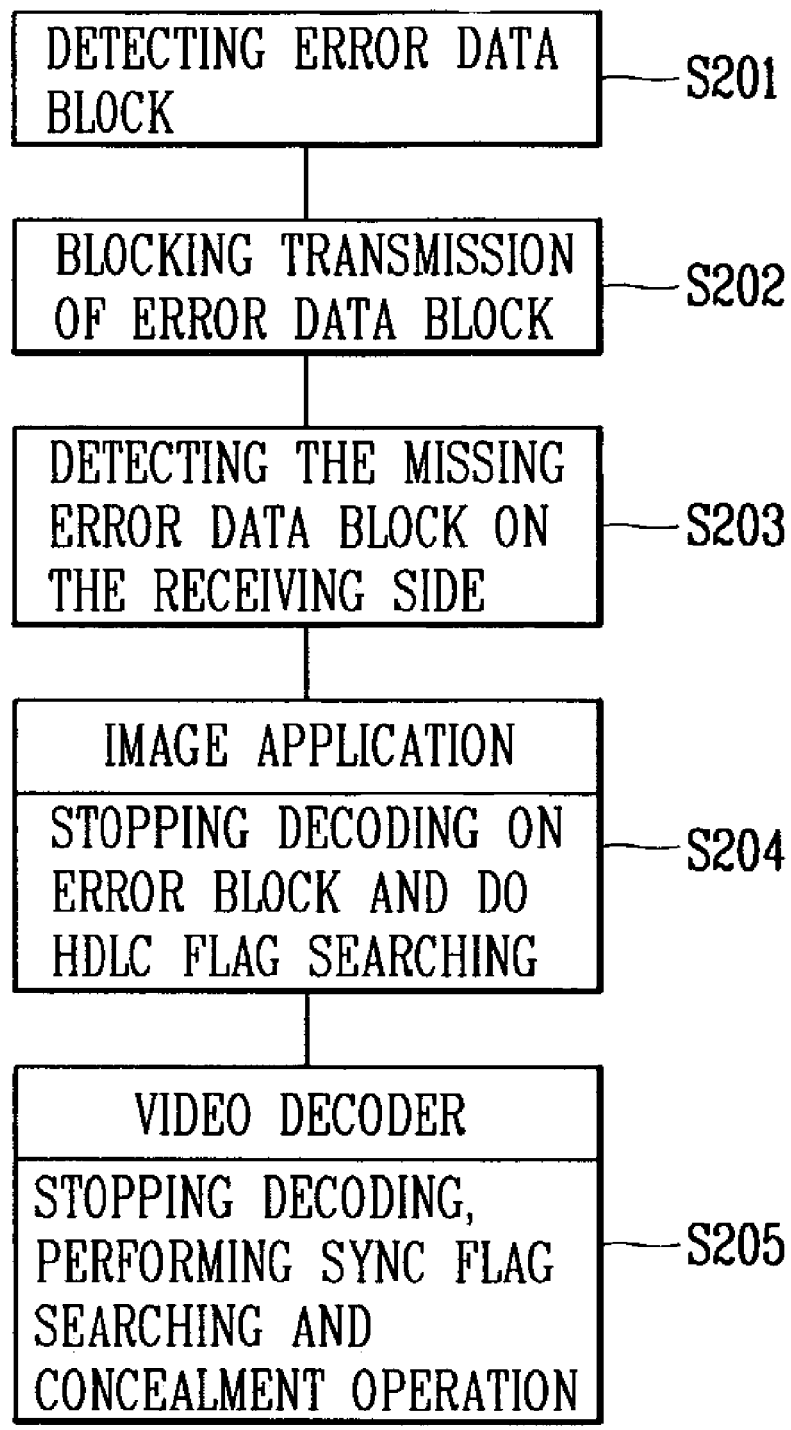
FIG. 4 is a flow chart showing steps included in an error detecting method in accordance with a second embodiment of the present invention.

Referring to FIG. 4, in another embodiment of the error detecting method in accordance with the present invention, when an uplink error occurs the base station system does not transmit the uplink error-generated data block. That is, the base station system transmits only the data without an uplink error to the circuit network.

An initial step therefore includes detecting an error in an image data block to be transmitted to a receiving terminal. (Block S201).

A second step includes blocking transmission of the error data block. (S202). In this case, the originating side may continue transmitting subsequent image data blocks that do not contain an error. The blocking step is preferably performed in a base station of the originating side.

A third step includes detecting that the error data block was not transmitted through the network. This may be indirectly accomplished by detecting that a specific data block (or packet) is not timely received or is determined to be missing. This, for example, may involve detecting that an error data block having a specific transmission sequence number is not received, within a predetermined period of time. Preferably, L1 (or L2) of the receiving terminal judges that an error has occurred in the data block in the uplink radio section and then sends a report to the image application accordingly (step S203). And then, steps S204 and S205 are performed which may be analogous to steps S104 and S105 previously discussed. In this embodiment, the receiving side can advantageously recognize whether an error exists in received data without any protocol for detecting an error.

The present invention therefore is a system and method for detecting an uplink error which solves a problem existing in mobile image transmission systems previously proposed. For example, with the error detecting method of the present invention, error detection available region can be extended and picture quality of a mobile image of a mobile communication terminal can be improved. In addition, because no protocol is required for detecting an error, a load to an application according to performing an additional cyclic redundancy check and a cost according to a protocol development can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An error-detecting method in a mobile communication system, comprising:
    detecting an error in a data block which has passed an uplink radio section;
    inserting a cyclic redundancy check (CRC) code into the error data block;
    transmitting the error data block with the CRC code to a receiving side; and
    performing a concealment operation on the error data block when the error data block is transmitted to and judged to be CRC fail in the receiving side, wherein the CRC code of the error data block has a predetermined bit pattern which causes a downlink radio section to exclude the error data block from being used as a basis for performing a downlink power control operation based on the predetermined bit pattern of the CRC code.

2. The method of claim 1, wherein the CRC code is generated and inserted by a base station system of a transmitting side.

3. The method of claim 2, wherein the base station system includes a base station, a radio network controller, and a mobile switching center.

4. An error-detecting method in a mobile communication system, comprising:
    checking whether an error exists in a data block which has passed an uplink radio section;
    inserting a cyclic redundancy check (CRC) code in the data block if the data is checked to have an error;
    detecting the error data block containing the CRC code on a receiving side;
    generating a CRC fail based on detection of the CRC code;
    reporting detection of an error to an image application; and
    performing a concealment operation on the error data block based on the CRC fail using the image application, wherein the CRC code of the error data block has a predetermined bit pattern which causes a downlink radio section to exclude the error data block from being used as a basis for performing a downlink power control operation based on the predetermined bit pattern of the CRC code.

5. The method of claim 4, wherein the CRC code is generated and inserted by a base station system of a transmitting side.

6. The method of claim 5, wherein the base station system includes a base station, a radio network controller, and a mobile switching center.

7. An error-detecting method in a mobile communication system, comprising:
    checking whether an error exists in a data block which has passed an uplink radio section;
    inserting a cyclic redundancy check (CRC) code into the data block if the data is detected to have an error;
    detecting the error data block containing the CRC code on a receiving side;
    generating a CRC fail based on detection of the CRC code; and
    stopping a decoding operation on the error data block and performing a concealment operation on the error data block based on the CRC fail, wherein the CRC code of the error data block has a predetermined bit pattern which causes a downlink radio section to exclude the error data block from being used as a basis for performing a downlink power control operation based on the predetermined bit pattern of the CRC code.

8. The method of claim 7, wherein the CRC code is generated and inserted by a base station system of a transmitting side.

9. The method of claim 8, wherein the base station system includes a base station, a radio network controller, and a mobile switching center.

10. The method of claim 7, wherein the uplink radio section is a radio section between an originating terminal and a radio network controller.

11. The method of claim 7, wherein the error data block includes moving picture information.

12. An-error detecting method in a mobile communication system, comprising:
    (a) detecting that a data block which has passed an uplink radio section has an error;
    (b) blocking transmission of the error data block without inserting a substitute data block for the error data block;

(c) determining that the error data block has not been timely received by a receiving side based on an undetected transmission sequence number corresponding to the error data block; and (d) performing a concealment operation on the error data block not timely received.

13. The method of claim 12, wherein steps (a) and (b) are performed in a base station system of the transmitting side.

14. The method of claim 13, wherein the base station system includes a base station, a radio network controller, and a mobile switching center.

15. The method of claim 12, wherein the uplink radio section is a radio section between an originating terminal and a radio network controller.

16. The method of claim 12, wherein the error data block includes moving picture information.

17. The method of claim 12, wherein a data transmission to the receiving terminal is performed based on a circuit network transmission method.

18. A system for detecting errors in a mobile communication system, comprising:
a detector which detects an error in a data block which has passed an uplink radio section;
a processor for inserting a cyclic redundancy check (CRC) code in the error data block; and
a transmitter for transmitting the error data block with the CRC code to a receiving side, wherein a processor at the receiving side performs a concealment operation on the error data block when the error data block is transmitted to and judged to be a CRC fail, wherein the CRC code of the error data block has a predetermined bit pattern which causes a downlink radio section to exclude the error data block from being used as a basis for performing a downlink power control operation based on the predetermined bit pattern of the CRC code.

19. The system of claim 18, further comprising:
a base station system at a transmitting side which generates and inserts the CRC code.

20. The system of claim 19, wherein the base station system includes a base station, a radio network controller, and a mobile switching center.

21. A system for transmitting data in a mobile communication system, comprising:
a detector which detects that a data block passing an uplink radio section includes an error; and
a controller which blocks transmission of the error data block without inserting a substitute data block for the error data block, wherein blocking transmission of the error data block generates a missing transmission sequence number corresponding to the error data block that is detectable relative to other data blocks that are transmitted.

22. The system of claim 21, further comprising:
a detector at a receiving side that determines that the error data block corresponding to the missing transmission sequence number has not been timely received, and performs a concealment operation on the error data block not timely received.

23. The system of claim 21, wherein the detector and controller are located in a base station system of a transmitting side.

24. The system of claim 23, wherein the base station system includes a base station, a radio network controller, and a mobile switching center.

25. An error-detecting method in a mobile communication system, comprising:
detecting an error in a data block which has passed an uplink radio section;
inserting a cyclic redundancy check (CRC) code into the error data block;
transmitting the error data block with the CRC code to a receiving side; and
performing a concealment operation on the error data block when the error data block is transmitted to and judged to be CRC fail in the receiving side, wherein detection of the CRC code of the error data block on the receiving side prevents the error data block from being used as an index for determining an operating state of a downlink section at the receiving side, the downlink section to exclude the error data block from being used as a basis for performing a downlink power control operation.

26. An error-detecting method in a mobile communication system, comprising:
checking whether an error exists in a data block which has passed an uplink radio section;
inserting a cyclic redundancy check (CRC) code in the data block if the data is detected to have an error;
detecting the error data block containing the CRC code on a receiving side;
generating a CRC fail based on detection of the CRC code;
reporting detection of an error to an image application; and
performing a concealment operation on the error data block based on the CRC fail using the image application, wherein detecting the CRC code of the error data block on the receiving side prevents the error data block from being used as an index for determining an operating state of a downlink section at the receiving side, the downlink section to exclude the error data block from being used as a basis for performing a downlink power control operation.

27. An error-detecting method in a mobile communication system, comprising:
checking whether an error exists in a data block which has passed an uplink radio section;
inserting a cyclic redundancy check (CRC) code into the data block if the data is detected to have an error;
detecting the error data block containing the CRC code on a receiving side;
generating a CRC fail based on detection of the CRC code; and
stopping a decoding operation on the error data block and performing a concealment operation based on the CRC fail, wherein detecting the CRC code of the error data block on the receiving side prevents the error data block from being used as an index for determining an operating state of a downlink section at the receiving side, the downlink section to exclude the error data block from being used as a basis for performing a downlink power control operation.

* * * * *